US012659138B2

(12) United States Patent
Medvinsky et al.

(10) Patent No.: US 12,659,138 B2
(45) Date of Patent: Jun. 16, 2026

(54) METHOD AND APPARATUS FOR DISTRIBUTING ENCRYPTED DEVICE UNIQUE CREDENTIALS

(71) Applicant: ARRIS Enterprises LLC, Horsham, PA (US)

(72) Inventors: Alexander Medvinsky, San Diego, CA (US); Tat Keung Chan, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 78 days.

(21) Appl. No.: 18/853,618

(22) PCT Filed: Feb. 9, 2023

(86) PCT No.: PCT/US2023/012739
§ 371 (c)(1),
(2) Date: Oct. 2, 2024

(87) PCT Pub. No.: WO2023/211538
PCT Pub. Date: Nov. 2, 2023

(65) Prior Publication Data
US 2025/0226974 A1     Jul. 10, 2025

Related U.S. Application Data

(60) Provisional application No. 63/334,372, filed on Apr. 25, 2022.

(51) Int. Cl.
*H04L 29/06*     (2006.01)
*H04L 9/08*     (2006.01)
*H04L 9/32*     (2006.01)

(52) U.S. Cl.
CPC .......... *H04L 9/0825* (2013.01); *H04L 9/0877* (2013.01); *H04L 9/3242* (2013.01)

(58) Field of Classification Search
CPC ... H04L 9/0825; H04L 9/0877; H04L 9/3242; H04L 9/0897; H04L 63/04; H04L 63/067;
(Continued)

(56) References Cited

U.S. PATENT DOCUMENTS

2020/0374275 A1    11/2020   Chan et al.

FOREIGN PATENT DOCUMENTS

WO     2022066142 A1    3/2022

OTHER PUBLICATIONS

International Search Report and Written Opinion RE: Application No. PCT/US23/12739, dated Mar. 31, 2022.

*Primary Examiner* — Joseph P Hirl
*Assistant Examiner* — Leynna Truvan
(74) *Attorney, Agent, or Firm* — Chernoff, Vilhauer, McClung & Stenzel, LLP

(57) ABSTRACT

A system and method for providing credentials device unique credentials to a chip is disclosed. In one embodiment, the method comprises receiving the credentials in credential provisioning server (CPS), the credentials having information encrypted according to a secure server key (SSK) securely stored in a hardware security module (HSM) communicatively coupled to the CPS, the hardware security module also securely storing a master key; receiving a credential request in the CPS, the credential request comprising a chip identifier that identifies the chip; securely decrypting the encrypted information in the HSM according to the SSK; securely computing a chip-unique key in the HSM, according to the chip identifier and the master key; re-encrypting the decrypted information according to the computed chip-unique key; and providing the credentials having the re-encrypted information to the device.

20 Claims, 7 Drawing Sheets

(58) Field of Classification Search
CPC ... H04L 9/0866; H04L 63/062; H04L 63/123;
H04L 12/40104; G06F 21/45; G06F
21/606; G11B 20/00224; G07B
2017/0087; H04W 12/0431; H04W
12/0471; G06Q 20/3821; G06Q
2220/145; H04N 1/32272; H04N 1/4486;
H04Q 2213/13339; H04Q 2213/339;
G11C 16/20; G11C 2029/4402; G03F
7/70541
See application file for complete search history.

METHOD AND APPARATUS FOR DISTRIBUTING ENCRYPTED DEVICE UNIQUE CREDENTIALS

CROSS-REFERENCE TO RELATED APPLICATIONS

The present application is a 371 National Stage patent Application claiming priority to PCT International Patent Application No. PCT/US23/12739 filed Feb. 9, 2023, which claims priority to U.S. Provisional App. No. 63/334,372 filed Apr. 25, 2022, the contents of which are each incorporated herein by reference in their entirety.

BACKGROUND

1. Field

The present disclosure relates to systems and methods for providing credentials to devices, and in particular, to a system and method for providing encrypted device unique credentials to devices.

2. Description of the Related Art

Systems have been developed to securely provision unique identities such as device credentials to devices in the factories where they are produced. Such devices include secure chips for performing one or more functions of the device. One such system is described in U.S. Pat. No. 8,761,401, which is hereby incorporated by reference herein. In this system, each set of unique device credentials is eventually delivered to a target device in a double-encrypted state. Such double encryption uses an inner layer of encryption and the result of that inner layer encryption is further encrypted with outer layer encryption. The inner layer of encryption uses an inner layer global key, which is protected inside the device whenever possible. The outer layer of encryption uses a one-time session key that can be computed via a key agreement protocol during a message exchange between the key server and the target chip.

In this paradigm, the device is trusted to fully decrypt the set of secret credentials, and then immediately re-encrypt the credentials using a hardware protected key inside the device. Some device vendors utilize a trusted execution environment (TEE) that is within a separate security processor to perform this highly sensitive task. Typically, the global inner layer key required to encrypt and decrypt the set of secret credentials before re-encryption exists only inside of a hardware security module (HSM) of the key management service which is packaging and delivering the secret credentials and inside the TEE of each secure chip.

While this solution is very secure, the device credentials are stored on a key server with global encryption. While the key server imposes a second layer of encryption using a key server-specific encryption key (ensuring that the credentials cannot be moved to another key server), the device credentials are not uniquely encrypted for a specific chip until re-encryption is performed by the target device itself. Some network operators and conditional access system (CAS)/digital rights management (DRM) vendors do not regard this solution to be sufficiently secure, at least in part because if the global inner-layer key were to be compromised, an entity wanting access to the secret device credentials could potentially extract those credentials from the chip before they are uniquely re-encrypted, and use those credentials to impersonate authorized devices.

SUMMARY

To address the requirements described above, this document discloses a system and method for providing credentials to a device including a chip. In one embodiment, the method comprises receiving the credentials in credential provisioning server (CPS), the credentials having information encrypted according to a secure server key (SSK) securely stored in a hardware security module (HSM) communicatively coupled to the CPS, the hardware security module also securely storing a master key; receiving a credential request in the CPS, the credential request comprising a chip identifier that identifies the chip; securely decrypting the encrypted information in the HSM according to the SSK; securely computing a chip-unique key in the HSM, according to the chip identifier and the master key; re-encrypting the decrypted information according to the computed chip-unique key; and providing the credentials having the re-encrypted information to the device. In this embodiment, the chip included in the device is pre-provisioned during chip manufacturing with the chip identifier, a one-time programmable (OTP) secret key associated with the chip identifier; and the chip unique key is derived at least in part from the OTP secret key.

Another embodiment is evidenced by an apparatus having a processor and a communicatively coupled memory storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
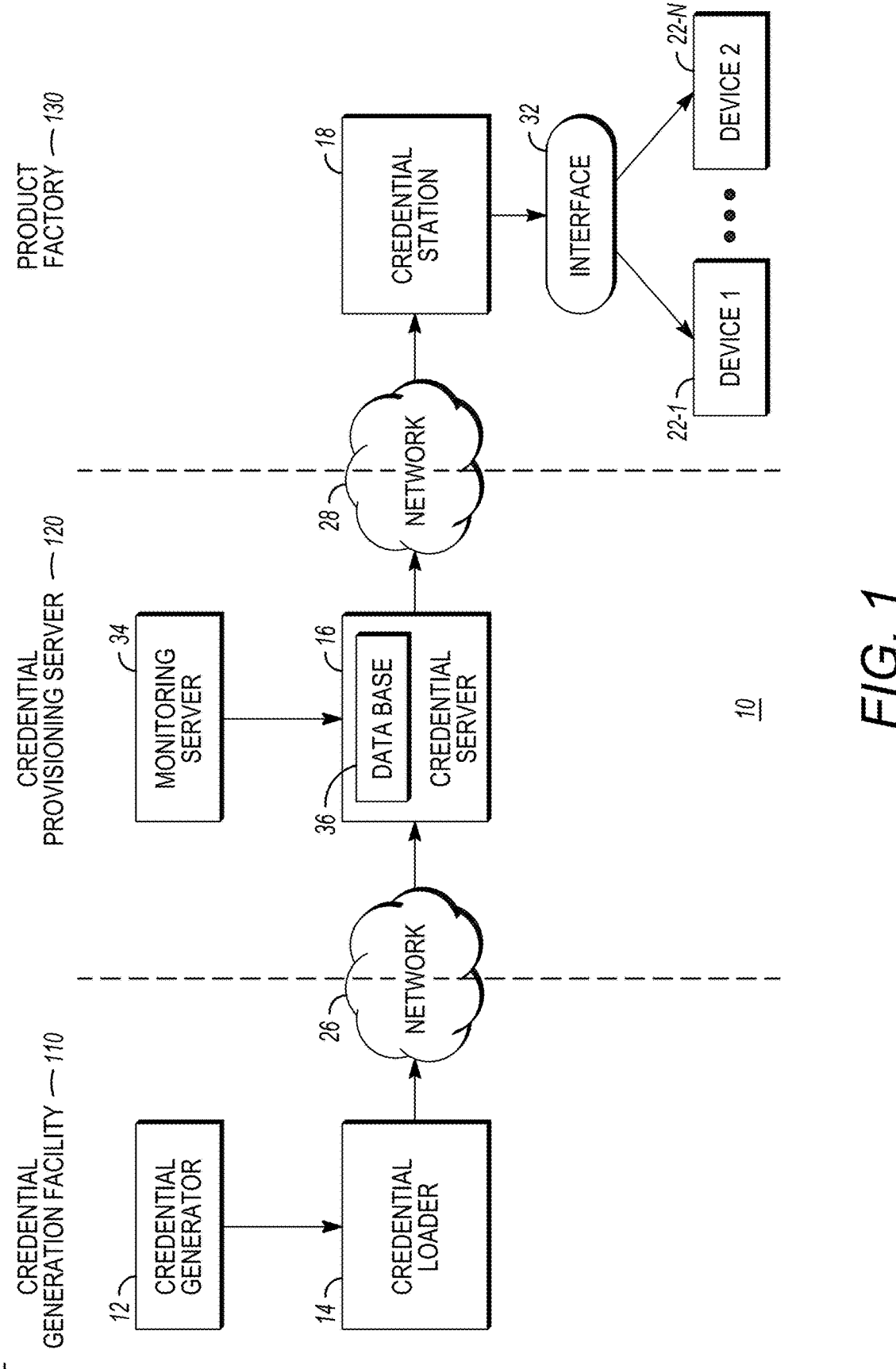
FIG. 1 is a diagram illustrating an infrastructure used to securely provision unique identities to devices.

In the following description, reference is made to the accompanying drawings which form a part hereof, and which is shown, by way of illustration, several embodiments. It is understood that other embodiments may be utilized and structural changes may be made without departing from the scope of the present disclosure.

Overview

As described above, there is a need to protect device credentials before they are decrypted and re-encrypted in the device in a way more secure than by using a global inner-layer key. A solution satisfying this need must provide for device credentials that are uniquely encrypted for each chip, while still inside the offline key generation facility. The same key management authority (KMA) that provides a unique one time programmable (OTP) encryption key for each chip must encrypt a set of unique device credentials using the same OTP key. However, this requires that the KMA know the set of chip IDs utilized in each device to look up and use the corresponding OTP keys. Unfortunately, that information is generally not available in advance of the manufacture of the device or the chips in the device.

Since manufacturing test code executing in a manufactured device can query the chip ID at the time a device request a set of credentials, other potential solutions are possible. For example, a straightforward solution would be to generate or order a set of device credentials for every single chip, encrypt each set of device credentials with each generated OTP key and load the result into a factory server. However, this solution has disadvantages. Firstly, chip vendors typically supply chips to different customers, and only a subset of those customers would desire that type of device credential. Secondly, the device customer would need to enter a business agreement to be able to load such credentials. Thirdly, the number of chips produced is typically far greater than the number of customers that would desire the credential supplied with the extra security, and some customers may not want or need this type of device credential and would therefore not want to pay for this feature. Finally, this solution results in wasted storage, CPU utilization and additional overhead from operations support. Accordingly, it is desirable to encrypt credentials for device models and customers only desirous of such features.

Described below is a system in which a factory key server finds the next set of credentials that has not yet been bound to a specific chip ID. When stored on a factory key server, the credentials are encrypted according to the factory server's secure server key (SSK). The factory key server includes a hardware security module (HSM) that is pre-provisioned (e.g. provided before any credential requests) with a master key (MK) and the SSK. The credentials are decrypted inside the HSM as a session key using the SSK, rendering them temporarily present in the HSM and handled as a secure object that is not disclosed outside of the HSM. A chip unique key (CUK) is computed from the master key. The CUK is then used to encrypt the credentials in the HSM before the encrypted credentials are transmitted to the chip. The chip then uses a pre-provisioned Chip ID and OTP key to independently generate the CUK. That CUK is used to decrypt the encrypted credentials, and the clear credentials can be encrypted within the chip using a different chip-unique key before storage. Alternatively, the credentials may simply be stored for later use when encrypted according to the CUK. In one embodiment, the CUK computed with the HSM is computed from the chip ID and the MK (thus producing the OTP key). In other embodiments, further operations are performed on the OTP key to generate the CUK, and the device likewise uses analogous operations to compute the CUK from its OTP key.

Background

FIG. 1 is a diagram depicting the infrastructure used to securely provision the unique identities to the devices. The system 10 includes a credential generation facility 110 that includes a credential generator 12 and a credential download server or loader 14. The system 10 also includes a credential server (CS) 16, a credential station 18 or product interface infrastructure 32, and a product personalization facility that manufactures one or more products 22-1-22-N (hereinafter alternatively referred to as device(s) 22) that use credential and/or other information.

For purposes of discussion herein, the term "credentials" refers to one or more of digital certificates, public keys and other confidential information that is loaded into manufactured devices, such as symmetric cryptographic keys, private keys, passwords, and other secret values.

As will be discussed in greater detail hereinbelow, the credential loader 14 can be coupled to the credential server 16 via one or more networks 26. Also, the credential server 16 can be coupled to the credential station 18 via one or more networks 28. The credential station 18 typically is coupled to one or more device(s) 22 via a product-specific interface 32, which preferably is not a network. Before the credentials have been loaded onto the product, the product does not yet have any cryptographic identity and cannot authenticate itself directly. Therefore, it is more secure to connect to the product via a non-networked interface that does not permit additional and possibly unauthorized devices or computers to be attached to that network. The system 10 also can include a monitoring server 34 coupled between the credential server 16 and the credential generator 12 for monitoring the status of the credential server 16.

Credential data generated by the credential generator 12 is preferably transported to the credential loader 14 using a secure interface that prevents hackers from somehow breaking through a firewall and obtaining unauthorized access to a credential generator. Alternatively, the credential generator 12 is able to securely transport credentials directly to a credential server 16. The credentials generator 12 can include one or more appropriate components for generating keys, such as private keys and public keys, digital certificates and/or other credential data and information used by products. For example, the credential generator 12 can be or include a hardware or HSM 504G. Also, the credential generator 12 can include or be part of a certificate authority (CA). The credential data generated by the credential generator 12 typically is encrypted using two layers of encryption before the generated credentials are transmitted from the credential generator 12 to the credential loader 14.

The credential loader 14 sends the credential data to the credential server 16, e.g., via the network 26. Alternatively, the logical function of the credential server 16 can be merged into the credential station 18 and the credential loader 14 can then connect to the credential station 18, e.g., via one or more of the network 26 and/or the network 28. The credential server 16 includes a database 36 that stores a relatively large amount of credential data. During the personalization of a specific manufactured product, the credential server 16 delivers, on demand, a unique and previously unused set of credential data to the credential station 18, e.g., via the network 28. The credential server 16 retains a relatively large supply of credential data in its database and thus guards against network connectivity interruptions between the credential loader 14 and the credential station 18.

The credential station 18 forwards credential data to one or more of device(s) 22, e.g., via the product-specific interface 32. The credential station 18 also is configured to bridge between the standardized output interface of the credential server 16 and the variable, possibly non-standard input interface of one or more of the device(s) 22. The device(s) 22 can be any suitable device that uses keys and/or other credential data or information for some purpose, e.g., digital rights management (DRM). For example, one or more of the product device(s) 22 can include but is not limited to a digital video recorder (DVR) or digital video server (DVS) device, including any signal converter or decoder (set-top) box with internal and/or external recording capabilities and local and/or remote storage, which often are referred to as personal video recorder (PVR) devices. Other suitable manufactured products a digital video disk recorder, a computer, a television, and any suitable mobile end user communication device, such as a cellular telephone, a smartphone, a personal digital assistant (PDA) device or other wireless handheld device, a digital camera, a laptop personal computer (PC) or a notebook PC.

The network 26 can be any private network or network server arrangement suitable for coupling directly or indirectly between the credential loader 14 and the credential server 16. The network 28 can be any private communication network or network server arrangement suitable for coupling directly or indirectly between the credential server 16 and the credential station 18. For example, all or a portion of the network 26 and/or the network 28 can be an Internet virtual private network (VPN) or other suitable private Internet protocol (IP) based network, computer network, web-based network or other suitable wired or wireless private network system. The product-specific interface 32 preferably is a local non-networked interface, such as a serial connection or a non-networked Ethernet connection with a cross-over cable, suitable for coupling directly or indirectly between the credential station 18 and one or more device(s) 22 manufactured at the product personalization facility.

The system 10 includes one or more layers of encryption for transmitting credential data from the credential data generation facility to the product personalization facility and the device(s) 22 manufactured therein. For example, as discussed hereinabove, the credential data generator 12 encrypts credential data end-to-end generated therein using a secret global inner-layer key that is pre-shared with the manufactured products and can only be removed by the manufactured product itself. The term "end-to-end" indicates that any intermediate servers (e.g., credential servers) do not have access to this key pre-shared with the manufactured product. Also, credential server (CS)-specific encryption can be used in addition to the end-to-end encryption, e.g., for credential data being delivered from the credential generator 12 to the credential loader 14. Such encryption is referred to herein as CS-specific encryption to reflect both types of encryption being used.

On top of the inner-layer key and the CS-specific encryption, a secure tunnel can be applied to the credential data transmitted from the credential loader 14 to the credential server 16. This secure tunnel is used to authenticate the identities of the credential loader and/or the credential server 16 and could optionally add another layer of encryption. This secure tunnel guards against illicit loading of data to the credential server 16 or spoofing output status data of the credential server 16, such as data involving the inventory of stored keys and/or other credential data on the credential server 16. Standard protocols such as Secure Socket Layer (SSL), Transport Layer Security (TLS) or Internet Protocol security (IPsec) can be used for this purpose. This secure tunnel is referred to herein as the credential loader secure tunnel. The credential server 16 also can make use of an authenticated key agreement to create a one-time shared session key, e.g., for one set of credential data transmitted from the credential server 16 to the manufactured product via the credential station 18. For example, the authenticated key agreement protocol may be Diffie-Hellman (DH) signed using the Rivest Shamir Adleman (RSA) algorithm, RSA-based key agreement, or Elliptic Curve Diffie-Hellman (ECDH) signed using the Elliptic Curve Digital Signature Algorithm (ECDSA). The credential station 18 itself does not participate in the authenticated key agreement. Because the credential station 18 is product-specific, it is typically designed and developed using personalization facility staff or other personnel without expertise in security. Therefore, the credential station 18 is less trusted than the credential server 16, and therefore acts only as a proxy. The credential station 18 is not trusted to participate in the authenticated key agreement.

The authenticated key agreement consists of the credential server 16 and the product generating random public/private key pairs and exchanging their key agreement public keys. Each side uses its key agreement private key and the other side's key agreement public key to come up with a shared key can be referred to as the CS session key.

The credential server 16 typically removes the CS-specific encryption layer (i.e., decrypts the CS-specific encryption layer with a CS-specific database key) from a set of credential data retrieved from its database before the authenticated key agreement takes place and CS session key encryption layer is added. The CS-specific database key is preferably protected by an HSM 504P on the CS. Therefore, the resulting encryption is referred to herein as CS session key encryption. A CS secure tunnel may be added on top of the CS session key-encrypted credential data, e.g., before passing the credential data from the credential server 16 to the credential station 18. The CS secure tunnel is used to authenticate the identities of the credential server 16 and/or the credential station 18, and optionally adds another layer of encryption. For example, a standard protocol, such as SSL, TLS or IPsec may be used to implement the CS secure tunnel.

As mentioned previously, the credential station 18 is less trustworthy than the credential server 16. Therefore, preferably, the private key of the credential station 18 that is used in the setup of this secure tunnel is protected within an HSM, which is a tamperproof device, such as a universal serial bus (USB) token or a peripheral component interconnect (PCI) card, installed in the credential station 18.

The credential station 18 typically removes the SSL encryption layer and passes credential data to the manufactured product using CS session key encryption. The product removes the CS session key encryption layer, leaving the end-to-end encryption originally added by the credential data generator 12. In addition to the encryption layers discussed, the network 26 and/or the network 28 may provide other additional encryption layers. Also, the product-specific interface 32 may provide its own interface-specific encryption layer in addition to the CS session key encryption.

The CS secure tunnel used for credential data transfer between the credential server 16 and the credential station 18 also is used by the credential server 16 to limit access to credential data only to a specific list of credential stations. Such list is called an Access Control List (ACL). That is, the credential server 16 securely obtains the identity of the credential station 18 during the secure tunnel establishment and then checks that this specific identity corresponds to an authorized credential station 18 that is in the ACL. For example, the identity of the credential station 18 may be an IP address and it may be securely obtained from a digital certificate of the credential station 18.

The CS-specific encryption used for credential data transfer between the credential data generator 12 and the credential server 16, e.g., via the credential loader 14, is used to assure that keys and other credential information intended for a specific credential server 16 can be used only on the specific target credential server 16. In this manner, the CS-specific encryption prevents any misrouting of credential data from the credential loader 14 to an incorrect credential server 16. In the interface between the credential loader 14 and the credential server 16, optionally the credential loader can query from the credential server 16 the identity of its CS-specific encryption key. This identity can be for example the hash of the CS-specific encryption key. By checking the identity of the CS-specific encryption key ahead of time, the credential loader avoids loading incorrectly encrypted data to a credential server 16 that it later cannot use. Also, the CS session key encryption used for credential data transfer between the credential server 16 and one or more of the device(s) 22 is used to guard against message replay between the credential server 16 and the device(s) 22, even though the device(s) 22 do not yet have a cryptographic identity to use with conventional classic authentication.

The end-to-end encryption used for credential data transfer between the credential data generator 12 and the device(s) 22 is used to assure that only the intended device(s) 22 of a specific model can decrypt the keys and/or other credential data intended for it. If the encryption used is asymmetric, i.e., where a different key is used for encryption than decryption and only the decryption key resides in the product of interest (e.g., public/private key cryptography), the encryption also assures that no data illicitly extracted from the product of interest will allow a non-authorized user to encrypt data for that family of products. Typically, there is only one end-to-end encryption key and one end-to-end decryption key for one family of products, such as a specific device model. Even within the same product, different keys that are used by different hardware or software modules may be encrypted using a different end-to-end key.

In operation, generally, within the system 10, the credential server 16 retrieves personalization data and/or other credential data for one of the device(s) 22 and then forwards the credential data as a single message to the appropriate device(s) 22, via the credential station 18. The credential data is retrieved from a local store on the CS platform, such as the database 36. The database 36 is replenished periodically with newly-created credential data from the credential data generator 12. Typically, the system 10 includes two or more server-class platforms independently running CS software, with each server-class platform including an independent credential database. Also, each server-class platform can be configured with an HSM, which holds the CS-specific decryption key or server specific key (SSK) as well as a private key used in the authenticated key agreement. The HSM of the credential server 16 itself is tamper-resistant and without it, the credential server 16 does not have the necessary keys to remove the CS-specific encryption layer or to participate in the authenticated key agreement with the manufactured product.

The credential server 16 is configured to apply to and be compatible with many different types of products or devices that require personalization of unique credential data in the product personalization facility or in other product locations, such as a distribution center or a service depot. The credential server 16 has a standardized interface to all credential stations 18 that do not depend on the manufactured product's model or on the type of credential data being provisioned. In general, the credential station 18 is a proxy coupled between the credential server 16 and a product that is being personalized, e.g., the device(s) 22. To implement a CS client inside a particular product, i.e., to load credential data onto the particular product, the format of the credential data for that particular type of device needs to be specified. Typically, there is a separate specification available for each type of credential data that is supported by the credential server 16.

During data delivery from the credential server 16 to the credential station 18, the credential station 18 issues a request for configuration data using data received from the particular product of interest. The configuration data typically includes the product device serial number or chip ID and the device's key agreement public key. For example, if the key agreement protocol is Diffie-Hellman, the public key is $g^y$ mod p. The credential station 18 formats this data appropriately for transmission to the credential server 16. The connection between the credential station 18 and the particular product or device being personalized varies depending on the particular type of device. For example, for mobile handset products or devices, the connection typically will be a serial interface, such as an RS232 interface or a USB (Universal Serial Bus) interface.

Figure 2:
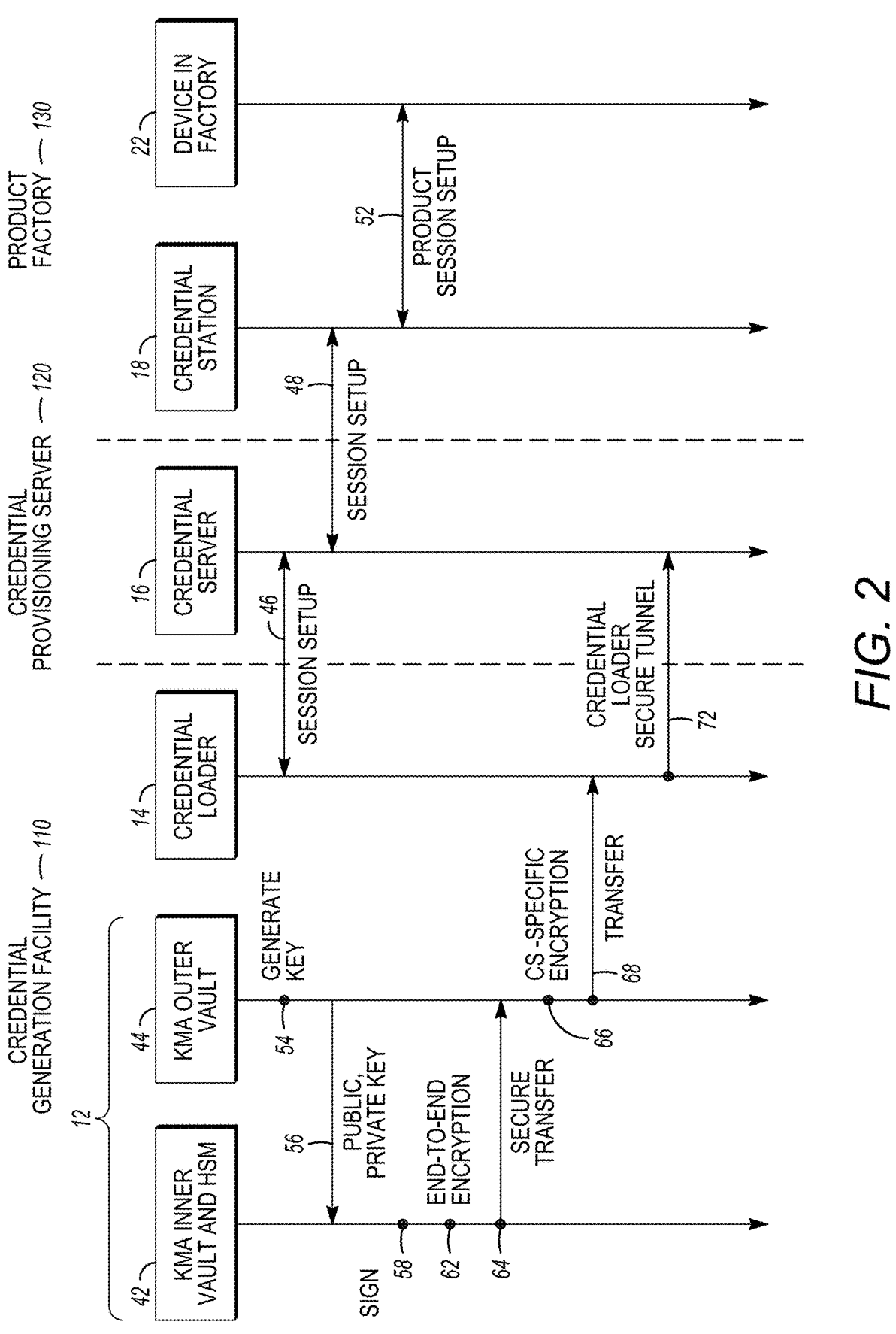
FIG. 2 is a block diagram illustrating data flow within the credential distribution system.

FIG. 2 is a block diagram 50 illustrating data flow within the credential distribution system 10. FIG. 2 shows the data flow of a private key and other appropriate credential data between the credential data generator 12 and the device(s) 22 using one or more of the encryption layers. As shown in FIG. 2, the credential data generator 12 includes a first portion 42 that includes a KMA inner vault and the host security module such as an HSM, and a second portion 44 that includes a KMA outer vault. The credential data or key generation facility 110 that includes the credential data generator 12 also includes the credential loader 14, although the credential loader 14 typically is located in a less secure area of the facility than the area of the credential data generator 12.

Initially, it is assumed that various sessions between various system components have been set up. For example, it is assumed that an SQL/SSL (Structured Query Language/Secure Sockets Layer) session setup or other appropriate session setup has been established between the credential loader 14 and the credential server 16. This session corresponds to the credential loader 14 secure tunnel described earlier. Such session setup is shown generally as a first session setup 46. Also, it is assumed that an SSL session setup or other appropriate session setup has been established between the credential server 16 and the credential station 18. This session corresponds to the credential server secure tunnel already described. Such session setup is shown generally as a second session setup 48. Also, it is assumed that a product session setup has been established between the credential station 18 and the product of interest, such as the device(s) 22. The product session setup is shown generally as a product session setup 52.

The first data activity in the data flow diagram is the generation of the credential data such as a private key. The credentials are generated within the KMA outer vault 44, and is shown generally as key generation 54. Next, the KMA outer vault 44 transfers the generated public key to the KMA inner vault 42 which signs the public key using a KMA private key inside the HSM and returns a digital certificate back to the outer vault 44 where generated device credentials may be optionally archived. These device credentials are alternatively obtained from an external source such as an external Certificate Authority (CA) or from a DRM licensing authority and securely transferred to the outer vault 44 on removable media.

The outer vault 44 then transfers the secret portion of device credentials (e.g., private key) to the inner vault 42 where it is encrypted using an end-to-end encryption key. Such encryption is shown generally as end-to-end encryption 62. The encrypted credentials are then loaded or securely transferred to the outer vault 44 via a secure network therebetween. The secure transfer is shown as secure transfer 64.

Next, the outer vault 44 encrypts the end-to-end-encrypted credentials with CS-specific encryption, resulting in two layers of encryption for the credentials. Such encryption is shown generally as CS-specific encryption 66. The CS-encrypted credentials are then moved from the outer vault portion of the credential data generator 12 to the credential loader 14. Such transfer is shown as transfer 68.

The CS-encrypted credentials are then transferred from the credential loader 14 to the credential server 16 using a secure tunnel therebetween shown as credential loader secure tunnel protected transfer 72. For example, this secure tunnel may be established using a standard protocol, such as SSL, TLS, or IPsec.

Figure 3:
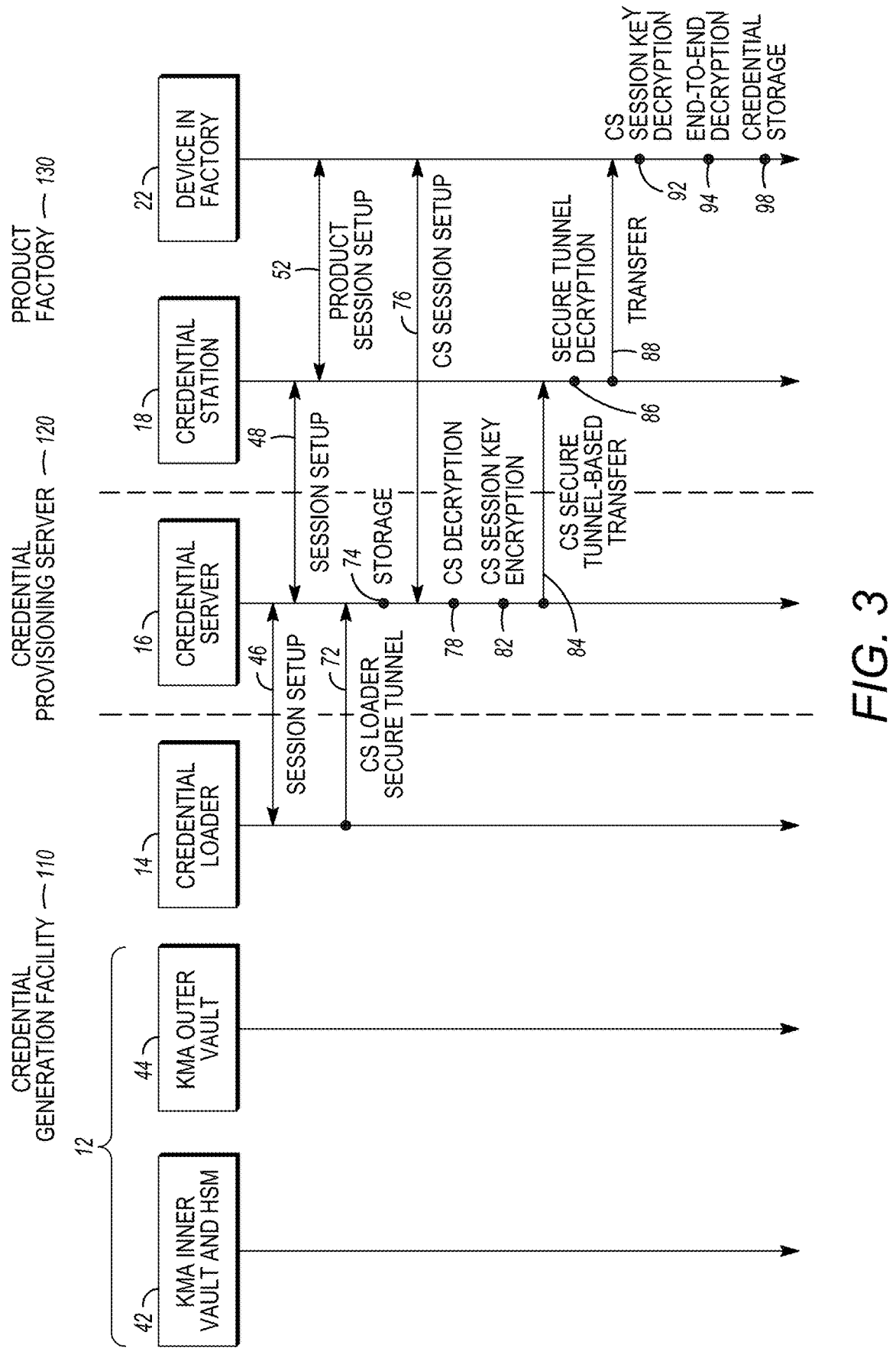
FIG. 3 is a block diagram continuing the illustration of the data flow within the credential distribution system.

FIG. 3 is a block diagram continuing the illustration of the data flow within the credential distribution system 10. FIG. 3 shows the data flow generally between the credential server (CS) 16 and the device(s) 22 in the product personalization facility, using one or more of the encryption layers. After the secure tunnel-protected transfer 72 of the CS-encrypted credentials from the credential loader 14 to the credential server 16, the credential server 16 stores or holds the encrypted credentials in the database 36 or other appropriate location within the credential server 16. The storage of the encrypted credentials is shown generally as storage 74. It should be understood that although the database 36 is shown internal to credential server 16, the database 36 can be external to the credential server 16 and securely coupled thereto.

The credential server 16 then establishes a CS session key using authenticated key agreement with the device of interest in the product personalization facility. Such session setup is shown generally as CS session setup 76. After the CS session is set up, the credential server 16 performs CS decryption of the CS-encrypted credentials stored therein, resulting in end-to-end-encrypted credentials. Such decryption is shown generally as CS decryption 78.

The credential server 16 then encrypts the end-to-end-encrypted credentials with a CS session key, resulting in CS session key-encrypted credentials. Such encryption is shown generally as CS session key encryption 82. After the end-to-end-encrypted credentials are also CS session key encrypted, the credential server 16 transfers the double-encrypted credentials to the credential station 18, e.g., over a secure tunnel therebetween. The transfer of the session key-encrypted credentials over the CS secure tunnel is shown generally as CS secure tunnel-based transfer 84.

Upon receipt of the CS session key-encrypted credentials from the credential server 16, e.g., via a CS secure tunnel-based transfer, the credential station 18 decrypts the received data using secure tunnel decryption, if necessary. The result is CS session key-encrypted credentials, is shown generally as secure tunnel decryption 86.

The CS session key-encrypted credentials are transferred to or loaded on the device of interest, which is typically located in the product personalization facility. Such transfer is shown generally as transfer 88. The device then decrypts the received data using CS session key decryption, resulting in an end-to-end-encrypted credentials. Such decryption is shown generally as CS session key decryption 92.

The device then decrypts the end-to-end-encrypted credentials using an end-to-end decryption key, resulting in non-encrypted credentials. Such decryption is shown generally as end-to-end decryption 96. The device then stores the non-encrypted credentials. Such storage is shown generally as credential storage. In this manner, a private key generated in the credential data generator 12 is securely delivered to a device in a relatively non-secure product personalization facility using several layers of encryption. Preferably, in step 98, the device either stores the private key in a secure storage area of the device (e.g., secure flash) or encrypts the clear private key using a secure hardware module before writing it out to persistent storage. Optionally, the end-to-end encryption that was originally applied at the data generation facility is retained in the device persistent storage.

Figure 4:
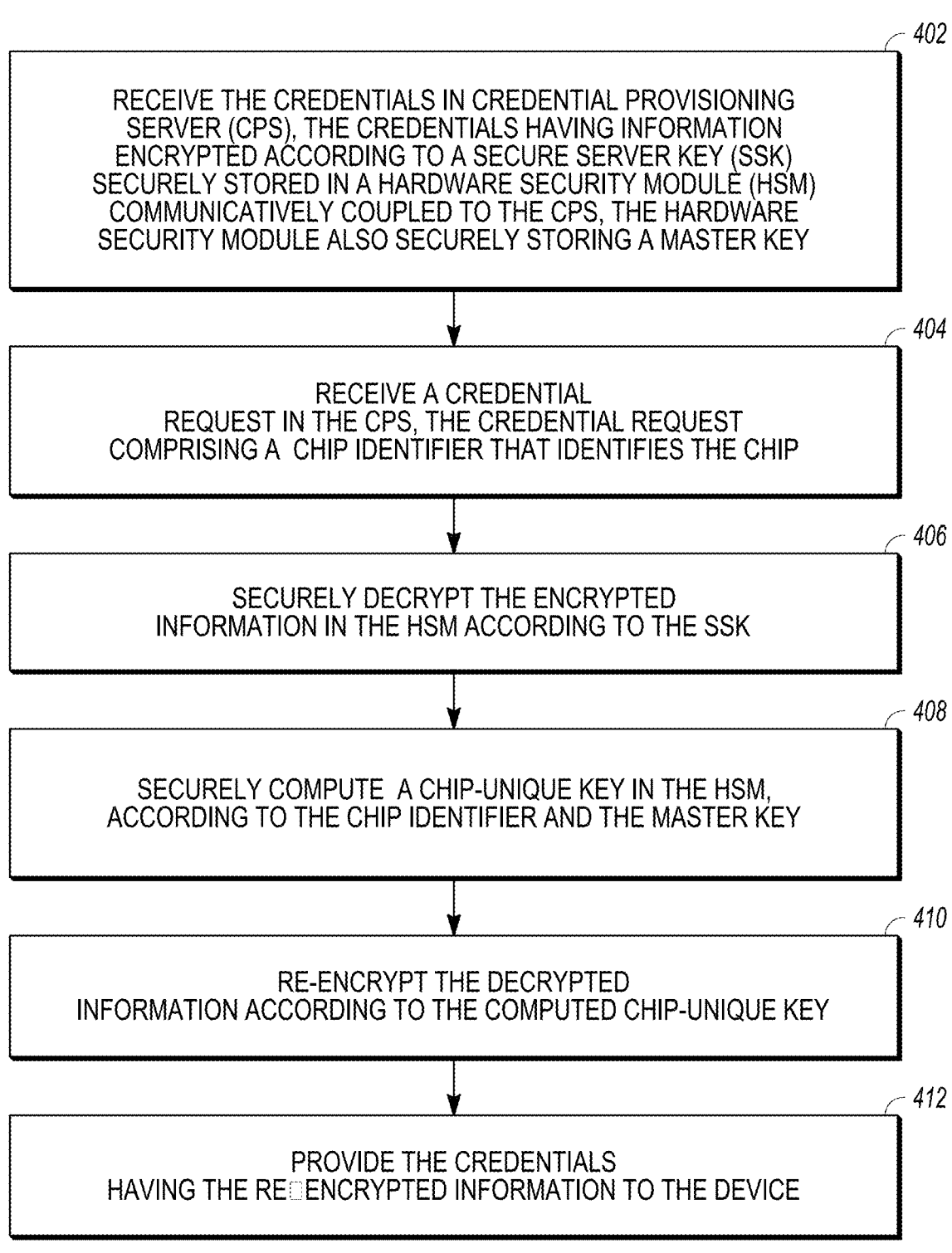
FIG. 4 is a diagram illustrating exemplary operations that can be performed to provide credentials that are uniquely encrypted for each particular chip.

FIG. 4 is a diagram illustrating exemplary operations that can be performed to provide credentials that are uniquely encrypted for each particular chip 140. FIG. 4 will be discussed in conjunction with FIG. 5, which is a block diagram illustrating the process and inter-relationships among such operations.

Generating and Providing Credentials to Credential Provisioning Server

Figure 5:
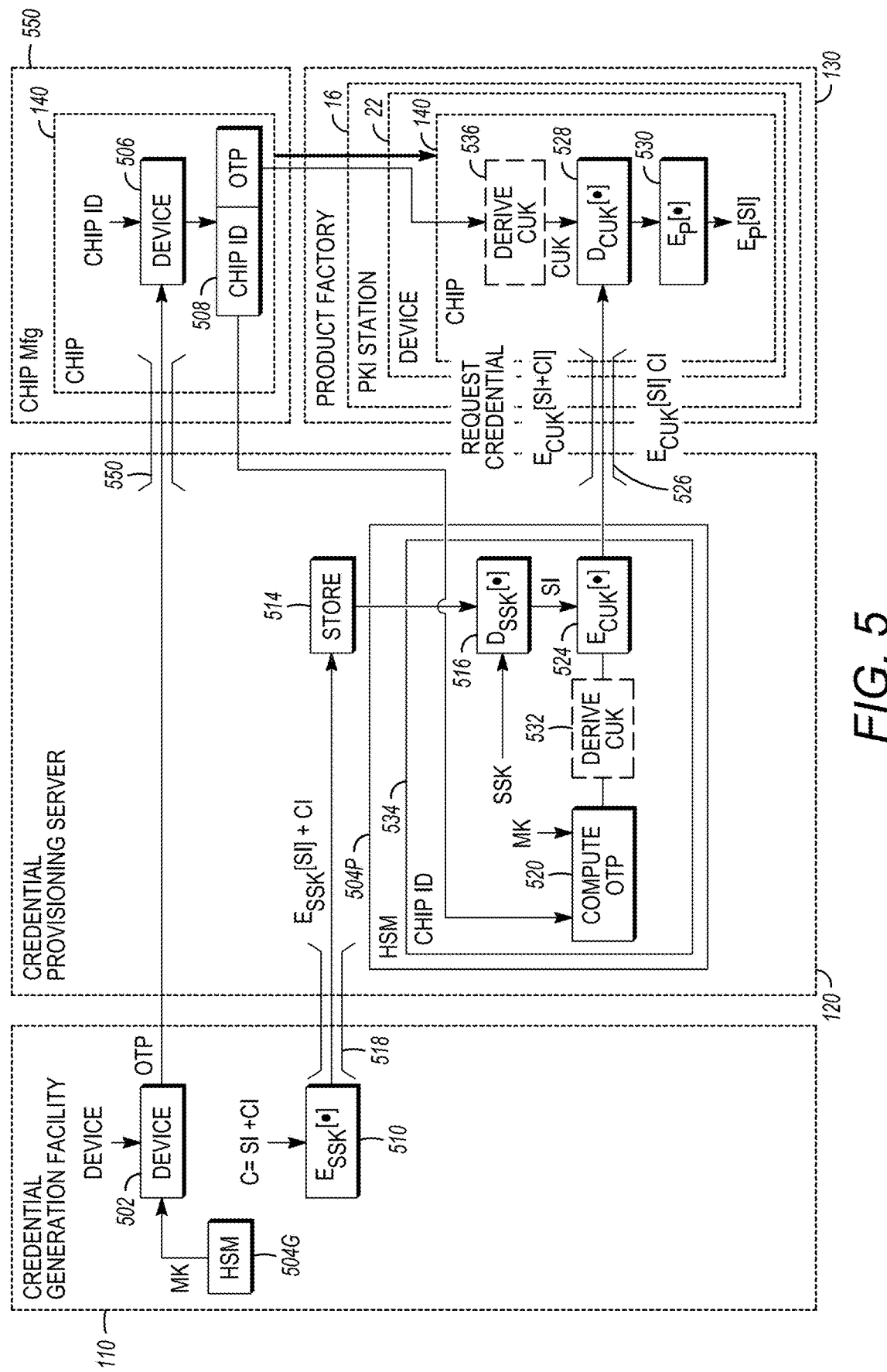
FIG. 5 is a block diagram illustrating the process and inter-relationships among the operations depicted in FIG. 4.

Referring first to FIG. 5, the process begins when a per-chip unique key is securely derived by a key derivation module 502 of the credential generation facility 110 for each chip 140 in which a per-chip unique key is desired. In one embodiment, the per-chip unique key is a one-time programmable (OTP) key is securely derived from a master key (MK) and a chip identifier (ID) as follows:

$$OTP \text{ Key} = \text{Derive} (MK, \text{Chip } ID)$$

Other parameters may also be used in this derivation, if desired. In one embodiment, the master key is securely stored inside an HSM 504G at the credential generator 100 facility. The derivation of the OTP key from the master key and the Chip ID may also be performed in an HSM 504G of the credential generation facility 110. The set of Chip IDs and the associated OTP keys are securely delivered (for example, via secure tunnel 550) to chip manufacturer 550, and the Chip ID and OTP key are securely programmed or securely stored in secure storage 508 of the chip 140 itself, thus pre-provisioning the chip 140 with the Chip ID and the OTP secret key. This is shown in block 506 of FIG. 5. The chip 140 is later installed into the product or device 22 at the product factory 130. The master key MK and a server specific key (SSK) is also provided to the credential provisioning server 120, and securely stored therein.

The credential generator 100 generates device credentials (indicated as "C" in FIG. 5). The device credentials include information encrypted according to a secure server key (SSK) that is securely stored in a hardware security module 504P communicatively coupled to the credential provisioning server 120. This information is referred to as "sensitive information" in the discussion below.

Figures 6, 7:
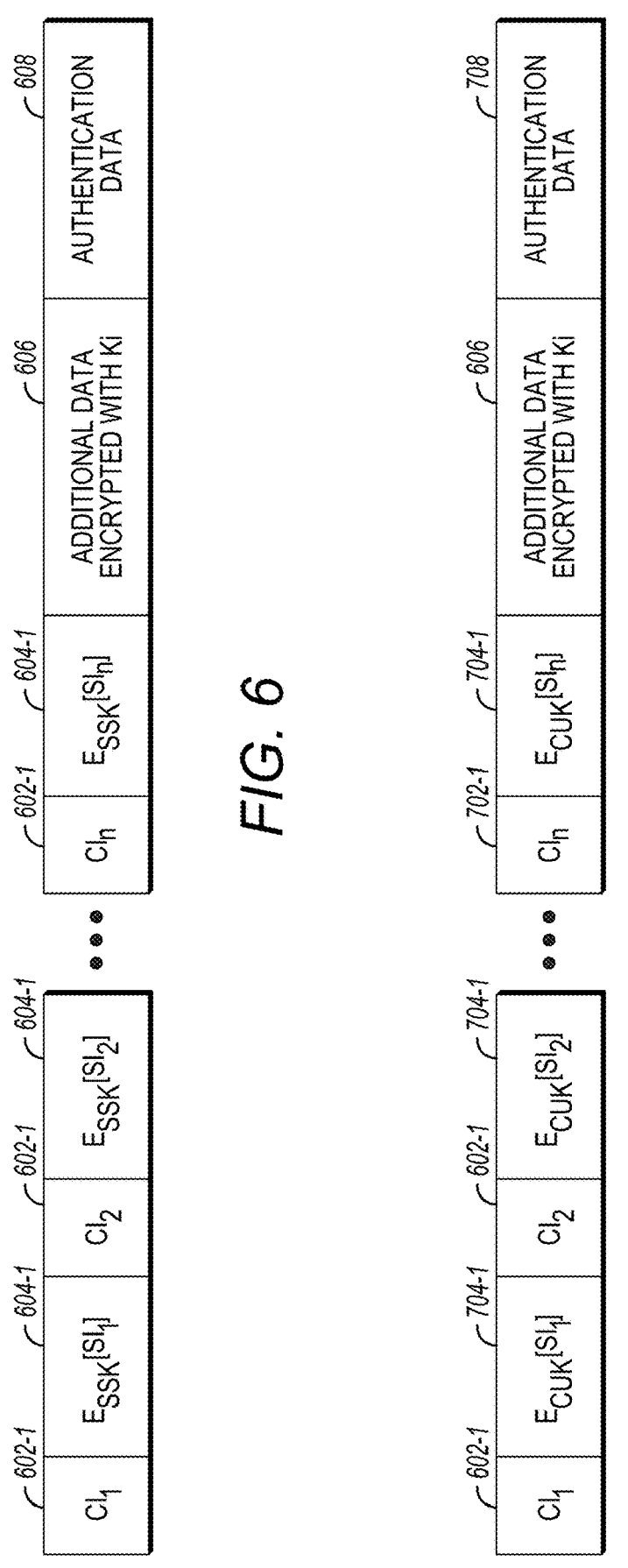
FIG. 6 is a diagram illustrating an exemplary embodiment of a format and constitution of device credentials.
FIG. 7 is a diagram illustrating an exemplary embodiment of the credentials having the re-encrypted information.

FIG. 6 is a diagram illustrating an exemplary embodiment of a format and constitution of device credentials. Device credentials may be of arbitrary type and include a plurality of cryptographic keys and associated identifiers. In the illustrated example, the device credentials include encrypted sensitive information ($E_{SSK}$[$SI_1$]-$E_{SSK}$[$SI_n$]) 604-1-604-$n$ (hereinafter alternatively collectively referred to as encrypted sensitive information or E[SI] 604) and optional clear information $CI_1$-$CI_n$ 602-1-602-$n$ (hereinafter alternatively collectively referred to as clear information or CI 602), additional data 606 and authentication data 608. The clear information CI 602 can include device type, identifiers, serial numbers, and analogous information. Each encrypted sensitive information segment ($E_{SSK}$[$SI_1$]-$E_{SSK}$[$SI_n$]) 604-1-604-$n$ of the credentials comprises an associated cryptographic credential key $K_1$ . . . $K_n$. Further, each encrypted sensitive information segment ($E_{SSK}$[$SI_1$]-$E_{SSK}$[$SI_n$]) 604-1-604-$n$ may include other components such as an integrity check value of the associated credential key $K_i$, and some padding bytes. The integrity value may be a hash of the associated credential key Ki or may be computed according to a further chip unique key computed for this purpose.

The number of padding bytes can be selected to render each encrypted sensitive information segment ($E_{SSK}$[$SI_1$]-$E_{SSK}$[$SI_n$]) 604-1-604-$n$ a same number of bytes as an HSM 504P session key object, so that the objects are treated like session key objects. A session key object is a cryptographic key which is temporarily and non-persistently stored in volatile memory of an HSM. It is automatically erased after a session between an HSM and its client, CS in this case, is closed. For example, the HSM 504P can be configured such that all 16 byte objects are handled as an AES-128 key, and all 32 byte objects as an AES-256 key. In such a case, padding may be added to a key of arbitrary length to increase the size of the object to 16 or 32 bytes to assure it can be decrypted and imported into the HSM secure processing environment. Arbitrary cryptographic key sizes may also be accommodated by informing the HSM 504P that the object is a cryptographic key for a crypto algorithm that accepts arbitrary key sizes. For example, by informing the HSM 504P that the object is a hash-based message authentication code HMAC-SHA256 key, which can be of arbitrary length.

As illustrated in FIG. 6, the credentials may include additional data 606 that is encrypted using one of the cryptographic keys $K_i$(e.g. any one or more of $K_1$, $K_2$, . . . , $K_n$). This additional data 606 need not be re-encrypted or otherwise modified prior to delivery to the chip 140. The credentials may also include authentication data 608, which may be derived from a cryptographic algorithm such as AES-CMAC or HMAC-Sha256 based on the chip unique OTP key and some or all of the remaining credentials. The value of the authentication data 608 can be compared to a value computed by the credential provisioning server 120 using the OTP key (once it is derived), to authenticate the received credentials.

An encryption module 510 of the credential generation facility 110 takes the credentials intended for the chip 140, encrypts the sensitive information SI within those credentials according the SSK to produce encrypted sensitive information $E_{SSK}$[SI] 604. The credential generator 100 may also encrypt the additional data using one or more of the cryptographic keys and include the encrypted additional data 606 in the credentials. Authentication data 608 cannot be computed by credentials generator 100 which doesn't know the value of OTP key—it would either be omitted at this point or a placeholder field may be added to the device credentials, with the intention of being replaced at the CS.

The credentials are then transmitted to the credential provisioning server 120. As described above, this can be accomplished via a secure tunnel 518 established by encrypting the credentials with a shared key arrived at via a key agreement. Referring to block 402 of FIG. 4, the credentials are received, and stored in secure storage 514 of the credential provisioning server 120.

Processing of Credentials Received from Credential Generator

In block 404, the credential provisioning server 120 receives a request for credentials. The credential request includes the Chip ID, which identifies the chip 140 that is embedded in a device 22 for which the credentials are requested. In block 406, a secure processing environment 534 of the HSM 504P of the credential provisioning server 120 securely decrypts the encrypted sensitive information $E_{SSK}$[SI] 604 within the credentials using decryptor 516 to produce the sensitive information SI. In one embodiment, the HSM 504P is constrained to operate on HSM session key objects solely within the secure processing environment 534. In such embodiments, defining processing objects as session key objects assures that such objects are processed in the secure processing environment 534 and not disclosed outside of the HSM 504P. The credentials may be decrypted in the credential provisioning server 120 after a request for credentials is received or in advance of such a request and stored for later use.

A chip unique key (CUK) is computed inside the secure processing environment 534 of the credential provisioning server HSM 504P according to the Chip ID (provided in the request for credentials) and the master key MK, as shown in block 408 of FIG. 4 and in block 520 of FIG. 5. An OTP key computation module 520 within the secure processing environment 534 of the HSM 504P computes the OTP key from the Chip ID and master key MK using the analogous operations that the credential generation facility 110 used to derive the OTP key that was provided to the manufacturer of the chip 140. In one embodiment, this computed OTP key itself represents the CUK. In other embodiments described below, further operations are performed to derive the CUK from the OTP key.

In embodiments in which the credentials include the authentication data 608, the HSM 504P may use the CUK to generate an authenticator for the provided credentials before or after they are decrypted. For example, the authentication data 608 may comprise a message authentication code (MAC) of the other credential data (e.g. any combination of clear information CI 602 and encrypted secure information E[SI] 604 and additional data 606) generated by the credential generation facility 110 according to the CUK. The credential provisioning server 120 may generate authentication data 608 by recomputing the OTP key using the Chip ID and the master key MK, and using the recomputed OTP key to derive CUK and subsequently generate message authentication code presented in the authentication data 608.

The decrypted sensitive information SI of the credentials is then re-encrypted within the secure processing environment 534 of the HSM 504P of the credential provisioning server 120. This is illustrated in block 410 of FIG. 4 and is performed by encryptor 524 of the secure processing environment 534 of the HSM 504P. The credentials having the re-encrypted information are then provided to the device(s) 22, preferably by second secure tunnel 526, as shown in block 412.

FIG. 7 is a diagram illustrating an exemplary embodiment of the credentials having the re-encrypted information 704. The device credentials now include re-encrypted sensitive information ($E_{CUK}$[$SI_1$]-$E_{CUK}$[$SI_n$]) 704-1-704-$n$ (hereinafter alternatively collectively referred to as re-encrypted sensitive information or re-encrypted RE[SI} 704), and optional clear information $CI_1$-$CI_n$ 602-1-602-n, additional data 606 and authentication data 608.

In one embodiment, only the sensitive information SI is re-encrypted according to the CUK. In other embodiments, both the sensitive information SI and the clear information CI 602 is encrypted by the CUK before being transmitted to the product factory and provided to the device(s) 22. Of course, as described above, transmission the of the credentials that include re-encrypted sensitive information $E_{CUK}$ [SI] 704 and clear information CI 602 is preferably also protected by transmitting the information via a second secure tunnel 526, for example, after deriving a secret key in a key agreement between the credential provisioning server 120 and the credential station 18 or the device(s) 22 in the product factory 130. For further protection, the credentials may be sent in a message signed by the credential provisioning server 120 that includes an authenticating certificate chain from a root of trust to the credential provisioning server 120.

Device Processing

The product factory 130 includes a credential station 18 that acts as a protocol translator between external entities and the device(s) 22.

The credential station 18 or device 22 receives the message with the credentials and verifies the signature of the credential provisioning server 120. The credential station 18 or device 22 then removes the outer layer of encryption imposed by the secure tunnel using the secret key arrived at by the key agreement. The chip 140 inside the device 22 retrieves the OTP key and uses the OTP key and the authentication data 608 to authenticate the received credentials. Since the sensitive information of the credentials is encrypted with the CUK when received, the encrypted SI may simply be stored for later decryption and use or secure storage with no further processing. A decryption module 528 of the chip 140 decrypts the encrypted sensitive information $E_{CUK}$[SI] later, when these provisioned credentials are utilized for their intended purpose such as Digital Rights Management or to establish a secure TLS or IPsec tunnel with another system. The device credentials may be re-encrypted by a chip re-encryption module 530 according to a private key P and stored for later decryption and use. Alternatively, since the credentials are encrypted when received from the CPS 120, the encrypted credentials can be stored as received from the HSM and decrypted by decryption module 528 when required.

Chip Unique Key Embodiments

As described above, the credential provisioning server HSM 504P computes the OTP key from the master key MK and the Chip ID, and uses that OTP key as the CUK. In such embodiments, the chip 140 reads the OTP key from secure memory 508 and uses it to decrypt the encrypted sensitive information $E_{CUK}$[SI] within the credentials. In other embodiments, the CUK is generated by an HSM CUK derivation module 532 of the HSM 504P from the OTP key by further performing a sequence of key derivation operations mirroring or complementary to those performed in the chip 140 by the chip CUK derivation module 536 to derive the CUK from the OTP key. The chip CUK derivation module 536 then rederives the CUK from the OTP. The CUK may be derived by performing a series of secret key derivation operations on the OTP key. For example, sequence of operations can include a plurality of one-way functions wherein the first function is performed according to the OTP key and each subsequent function uses a result of each preceding function as a secret key. In one embodiment, at least one of the one-way functions is a one-way message authentication code (MAC). At least one such operation may be a decryption operation, using the OTP key as a decryption key. Further, the secret sequence of operations may comprise a decrypt operation equivalent to an "unwrap" operation in the HSM 504P, and a "derive" operation comprising an exclusive OR (XOR) operation and concatenation of two keys. The HSM 504P may handle the interim results and the final result as session keys (meaning keys stored in the volatile memory of the HSM), which are inherently secure and protected within the secure processing environment 534 of the HSM 504P.

In such embodiments, the HSM 504P of the credential provisioning server 120 performs analogous operations to generate the CUK to re-encrypt the decrypted sensitive information SI before assembling the credentials and providing them to the device(s) 22.

The chip 140 later securely computes the CUK from the OTP key using analogous operations, using operations that mirror those performed in the credential provisioning server 120. The chip 140 then uses the CUK to decrypt the encrypted sensitive information in the credentials.

In still another embodiment, instead of computing a single CUK to re-encrypt each of the decrypted sensitive information segments $SI_1$, $SI_2$, . . . , $SI_n$, a different CUK may be derived for each segment (resulting in $E_{CUK1}$[$SI_1$], in $E_{CUK2}$ [$SI_2$], . . . in $E_{CUK1}$[$SI_n$]). In this embodiment, each $CUK_i$ may be derived in the HSM 504P with a different sequence of "unwrap" and "derive" steps, with each $CUK_i$ rederived in the chip 140 using analogous associated sequences. Also, in embodiments in which the sensitive information segments each comprise a credential key and an integrity check value, the $CUK_i$ for each segment may be used to compute the integrity value for that segment. In this embodiment, the chip 140 securely computes a $CUK_i$ for each of the plurality of segments from the OTP secret key, and uses that $CUK_i$ to decrypt each encrypted segment. If each sensitive information segment $SI_1$, $SI_2$, . . . , $SI_n$ included an integrity value, the $CUK_i$ of each segment can be used to assure the integrity of the segment.

The chip 140 may also recompute the authentication data for the received credentials and compare it to the authentication data 608 to verify integrity, using the same operations that the credential provisioning server 120 used to generate the authentication data 608 for the credentials received from the credential generation facility 110. This authentication process can take place before or after the encrypted sensitive information is decrypted. The value of the recomputed authentication data 708 can be computed over the clear information CI 602 and the encrypted sensitive information 604. In still another embodiment, the authentication data can be computed from a further CUK (e.g. $CUK_{n+1}$), which is also computed using a different sequence of unwrap and derive steps than the other CUKs. Likewise, the chip 140 securely computes $CUK_{n+1}$ using an analogous sequence of unwrap and derive steps, and uses $CUK_{n+1}$ to authenticate the data.

Hardware Environment

Figure 8:
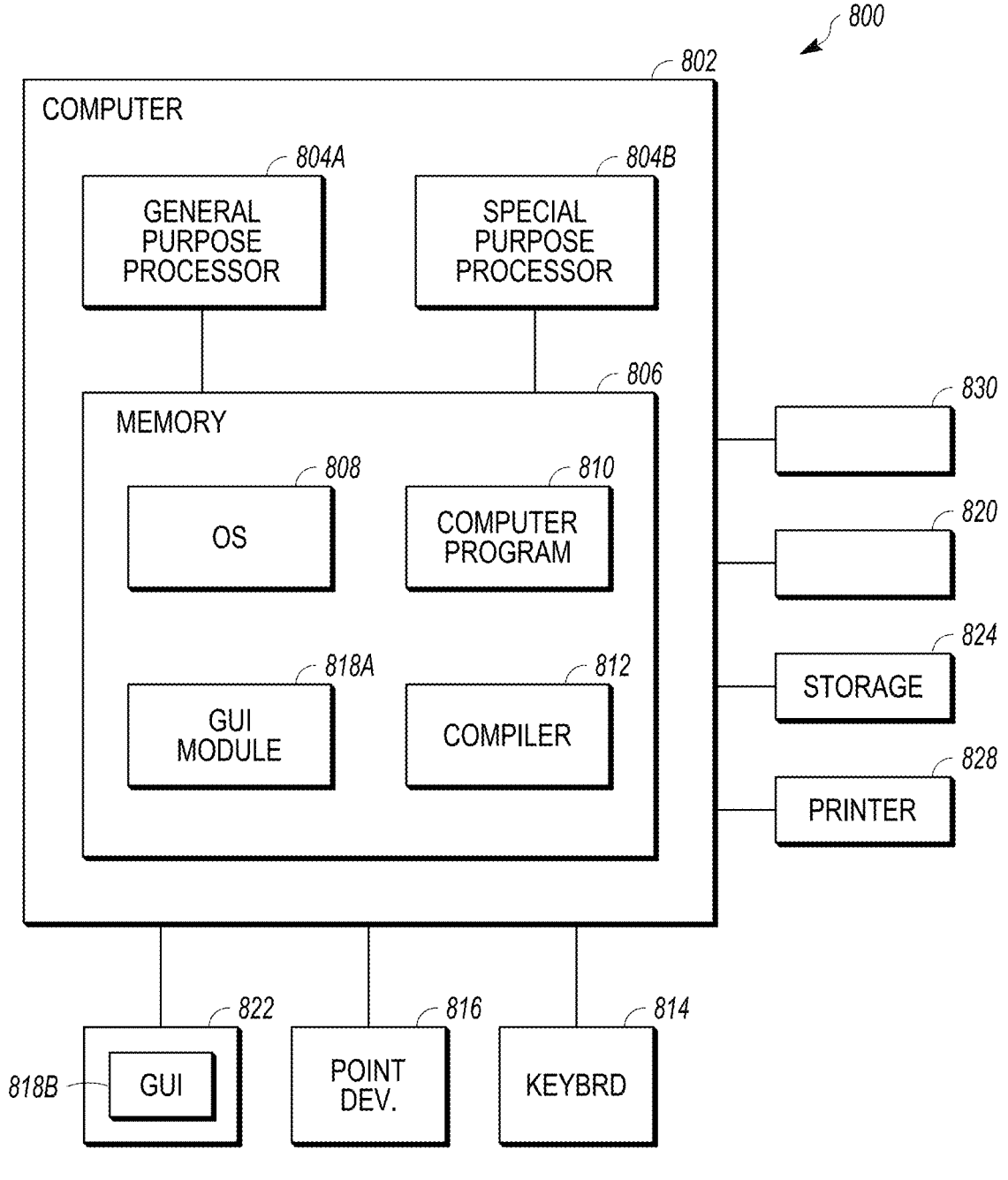
FIG. 8 illustrates an exemplary computer system that could be used to implement processing elements of the credential distribution system.

FIG. 8 illustrates an exemplary computer system 800 that could be used to implement processing elements of the above disclosure, including elements of the credential generation facility 110, the credential provisioning server 120, the product factory 130, the HSMs. The computer 802 comprises a processor 804 and a memory, such as random access memory (RAM) 806. The computer 802 is operatively coupled to a display 822, which presents images such as windows to the user on a graphical user interface 818B. The computer 802 may be coupled to other devices, such as a keyboard 814, a mouse device 816, a printer 828, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818B is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 802, causes the computer 802 to perform the operations herein described. Computer program 810 and/or operating instructions may also be tangibly embodied in memory 806 and/or data communications devices 830, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure. A method of providing credentials to a device including a chip is disclosed. In one embodiment, the method comprises: receiving the credentials in credential provisioning server (CPS), the credentials having information encrypted according to a secure server key (SSK) securely stored in a hardware security module (HSM) communicatively coupled to the CPS, the hardware security module also securely storing a master key; receiving a credential request in the CPS, the credential request comprising a chip identifier that identifies the chip; securely decrypting the encrypted information in the HSM according to the SSK; securely deriving a chip-unique key in the HSM, according to the chip identifier and the master key; re-encrypting the decrypted information according to the computed chip-unique key; and providing the credentials having the re-encrypted information to the device; wherein: the chip included in the device is pre-provisioned during chip manufacturing with the chip identifier; a one-time programmable (OTP) secret key associated with the chip identifier; and the chip-unique key is computed at least in part from the OTP secret key.

Another embodiment is evidenced by the method above, wherein: the master key is pre-provisioned to the HSM; the HSM includes a secure processing environment; and the encrypted information is securely decrypted in the secure processing environment and the chip-unique key is securely derived in the secure processing environment.

Another embodiment is evidenced by any of the above methods wherein: the HSM is constrained to operate on HSM session key objects solely within the secure processing environment; and the encrypted information comprise a plurality of encrypted segments, each of the plurality of encrypted segments comprising: a credential key; an integrity check value; and padding bytes sufficient to render the encrypted information a same number of bytes as an HSM session key object.

Another embodiment is evidenced by any of the above methods wherein the chip-unique key is the OTP secret key.

Another embodiment is evidenced by any of the above methods wherein: the credentials further comprise authentication data computed according to the OTP secret key; and the method further comprises authenticating the credentials in the chip according to the OTP secret key.

Another embodiment is evidenced by any of the above methods wherein securely computing the chip-unique key in the HSM according to the chip identifier and the master key comprises: computing the OTP secret key from the master key and an chip identifier; and computing the chip-unique key from the OTP secret key.

Another embodiment is evidenced by any of the above methods wherein the chip securely computes the chip-unique key from the OTP secret key according to a first secret sequence; and the HSM securely computes the chip-unique key according to a second secret sequence complimentary to first secret sequence.

Another embodiment is evidenced by any of the above methods wherein deriving the chip-unique key includes performing a plurality of one-way functions, wherein: a first function is performed according to the OTP secret key; and each subsequent function uses a result of each preceding function as a secret key.

Another embodiment is evidenced by any of the above methods wherein: at least one of the one-way functions performed is a decryption operation; and the OTP secret key is a decryption key.

Another embodiment is evidenced by any of the above methods wherein at least one of the one-way functions is a one-way message authentication code (MAC) operation.

Another embodiment is evidenced by any of the above methods wherein: the HSM is constrained to operate on HSM session key objects solely within the secure processing environment; and the encrypted information comprise a plurality of encrypted segments, each of the plurality of encrypted segments comprising: a credential key; an integrity check value; and padding bytes sufficient to render the encrypted information a same number of bytes as an HSM session key object. Also, securely decrypting the encrypted information in the HSM according to the SSK comprises: securely decrypting each of the encrypted segments according to the SSK, and securely computing the chip-unique key in the HSM, according to the chip identifier and the master key comprises computing the OTP secret key from the master key and an chip identifier; and computing the chip-unique key for each of the plurality of segments from the OTP secret key. Further, re-encrypting the decrypted information according to the computed chip-unique key comprises re-encrypting each of the plurality of segments according to the chip-unique key associated with each segment.

Another embodiment is evidenced by any of the above methods wherein: the method(s) further comprises computing a further chip unique key; and the integrity check value is computed according to the further chip unique key.

Another embodiment is evidenced by any of the above methods wherein: the chip securely computes the chip-unique key for each of the plurality of segments from the OTP secret key.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of providing credentials to a device including a chip, the method comprising:

receiving the credentials in credential provisioning server (CPS), the credentials having information encrypted according to a secure server key (SSK) securely stored in a hardware security module (HSM) communicatively coupled to the CPS, the hardware security module also securely storing a master key;

receiving a credential request in the CPS, the credential request comprising a chip identifier that identifies the chip;

securely decrypting the encrypted information in the HSM according to the SSK;

securely deriving a chip-unique key in the HSM, according to the chip identifier and the master key;

re-encrypting the decrypted information according to the computed chip-unique key; and providing the credentials having the re-encrypted information to the device;

wherein:

the chip included in the device is pre-provisioned during chip manufacturing with:

the chip identifier;

a one-time programmable (OTP) secret key associated with the chip identifier; and the chip-unique key is computed at least in part from the OTP secret key.

2. The method of claim 1, wherein:

the master key is pre-provisioned to the HSM;

the HSM includes a secure processing environment; and the encrypted information is securely decrypted in the secure processing environment and the chip-unique key is securely derived in the secure processing environment.

3. The method of claim 2, wherein:

the HSM is constrained to operate on HSM session key objects solely within the secure processing environment; and the encrypted information comprise a plurality of encrypted segments, each of the plurality of encrypted segments comprising:

a credential key;

an integrity check value; and padding bytes sufficient to render the encrypted information a same number of bytes as an HSM session key object.

4. The method of claim 2, wherein the chip-unique key is the OTP secret key.

5. The method of claim 2, wherein:

the credentials further comprise authentication data computed according to the OTP secret key; and the method further comprises authenticating the credentials in the chip according to the OTP secret key.

6. The method of claim 2, wherein securely computing the chip-unique key in the HSM according to the chip identifier and the master key comprises:

computing the OTP secret key from the master key and an chip identifier; and computing the chip-unique key from the OTP secret key.

7. The method of claim 6, wherein:

the chip securely computes the chip-unique key from the OTP secret key according to a first secret sequence; and the HSM securely computes the chip-unique key according to a second secret sequence complimentary to first secret sequence.

8. The method of claim 7, wherein deriving the chip-unique key includes performing a plurality of one-way functions, wherein:

a first function is performed according to the OTP secret key; and each subsequent function uses a result of each preceding function as a secret key.

9. The method of claim 8, wherein:

at least one of the one-way functions performed is a decryption operation; and the OTP secret key is a decryption key.

10. The method of claim 8, wherein at least one of the one-way functions is a one-way message authentication code (MAC) operation.

11. The method of claim 2, wherein:

the HSM is constrained to operate on HSM session key objects solely within the secure processing environment; and the encrypted information comprise a plurality of encrypted segments, each of the plurality of encrypted segments comprising:

a credential key;

an integrity check value; and padding bytes sufficient to render the encrypted information a same number of bytes as an HSM session key object;

securely decrypting the encrypted information in the HSM according to the SSK comprises:

securely decrypting each of the encrypted segments according to the SSK;

securely computing the chip-unique key in the HSM, according to the chip identifier and the master key comprises:

computing the OTP secret key from the master key and an chip identifier; and computing the chip-unique key for each of the plurality
of segments from the OTP secret key, re-encrypting the decrypted information according to the
computed chip-unique key comprises:

re-encrypting each of the plurality of segments according
to the chip-unique key associated with each
segment.

12. The method of claim 11, wherein:

the method further comprises computing a further chip
unique key; and the integrity check value is computed according to the
further chip unique key.

13. The method of claim 11, wherein:

the chip securely computes the chip-unique key for each
of the plurality of segments from the OTP secret key.

14. An apparatus for providing credentials to a device
including a chip, comprising:

a processor; and a memory, communicatively coupled to the processor, the
memory storing processor instructions comprising processor
instructions for:

receiving the credentials in credential provisioning
server (CPS), the credentials having information
encrypted according to a secure server key (SSK)
securely stored in a hardware security module
(HSM) communicatively coupled to the CPS, the
hardware security module also securely storing a
master key;

receiving a credential request in the CPS, the credential
request comprising a chip identifier that identifies the
chip;

securely decrypting the encrypted information in the
HSM according to the SSK;

securely computing a chip-unique key in the HSM,
according to the chip identifier and the master key;

re-encrypting the decrypted information according to
the computed chip-unique key; and providing the credentials having the re-encrypted information
to the device;

wherein:

the chip included in the device is pre-provisioned
during chip manufacturing with:

the chip identifier;

a one-time programmable (OTP) secret key associated
with the chip identifier; and the chip-unique key is computed at least in part from
the OTP secret key.

15. The apparatus of claim 14, wherein:

the master key is pre-provisioned to the HSM;

the HSM includes a secure processing environment; and the encrypted information is securely decrypted in the
secure processing environment and the chip-unique key
is securely derived in the secure processing environment.

16. The apparatus of claim 15, wherein:

the HSM is constrained to operate on HSM session key
objects solely within the secure processing environment;
and the encrypted information comprise a plurality of
encrypted segments, each of the plurality of encrypted
segments comprising:

a credential key;

an integrity check value; and padding bytes sufficient to render the encrypted information
a same number of bytes as an HSM session
key object.

17. The apparatus of claim 15, wherein the chip-unique
key is the OTP secret key.

18. The apparatus of claim 15, wherein the processor
instructions for securely computing the chip-unique key in
the HSM according to the chip identifier and the master key
comprise processor instructions for:

computing the OTP secret key from the master key and an
chip identifier; and computing the chip-unique key from the OTP secret key.

19. The apparatus of claim 15, wherein:

the HSM is constrained to operate on HSM session key
objects solely within the secure processing environment;
and the encrypted information comprises a plurality of
encrypted segments, each of the plurality of encrypted
segments comprising:

a credential key;

an integrity check value; and padding bytes sufficient to render the encrypted information
a same number of bytes as an HSM session
key object;

the processor instructions for securely decrypting the
encrypted information in the HSM according to the
SSK comprise processor instructions for:

securely decrypting each of the encrypted segments
according to the SSK;

the processor instructions for securely computing the
chip-unique key in the HSM, according to the chip
identifier and the master key comprise processor
instructions for:

computing the OTP secret key from the master key and
an chip identifier; and computing the chip-unique key for each of the plurality
of segments from the OTP secret key, the processor instructions for re-encrypting the decrypted
information according to the computed chip-unique
key comprise processor instructions for:

re-encrypting each of the plurality of segments according
to the chip-unique key associated with each
segment.

20. An apparatus for providing credentials to a device
including a chip, comprising:

means for receiving the credentials in credential provisioning
server (CPS), the credentials having information
encrypted according to a secure server key (SSK)
securely stored in a hardware security module (HSM)
communicatively coupled to the CPS, the hardware
security module also securely storing a master key;

means for receiving a credential request in the CPS, the
credential request comprising a chip identifier that
identifies the chip;

means for securely decrypting the encrypted information
in the HSM according to the SSK;

means for securely computing a chip-unique key in the
HSM, according to the chip identifier and the master
key;

means for re-encrypting the decrypted information
according to the computed chip-unique key; and means for providing the credentials having the re-encrypted
information to the device;

wherein:

the chip included in the device is pre-provisioned
during chip manufacturing with:

the chip identifier;

a one-time programmable (OTP) secret key associated
with the chip identifier; and the chip-unique key is derived at least in part from the
OTP secret key.

* * * * *